UNITED STATES PATENT OFFICE.

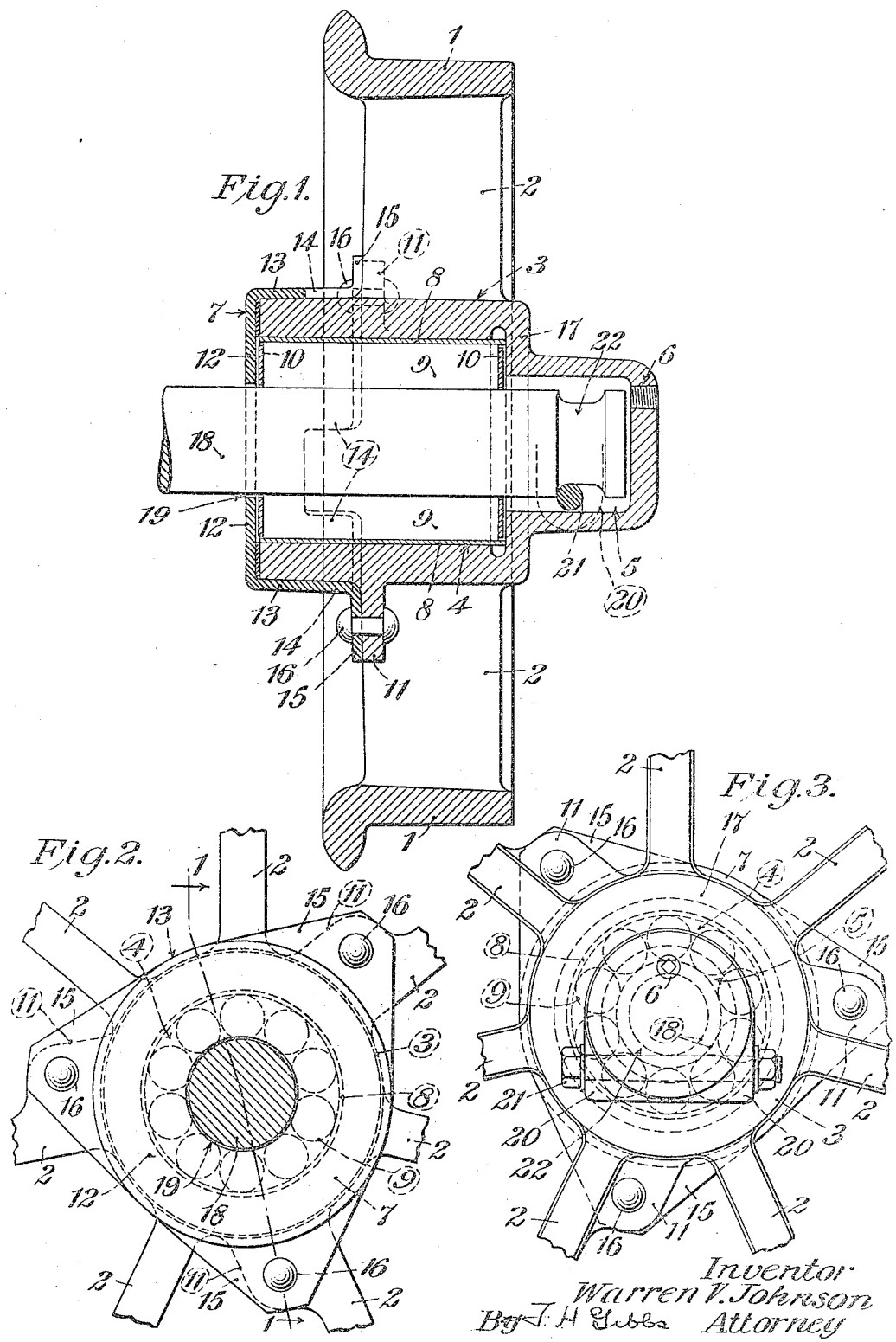

WARREN V. JOHNSON, OF BLOOMSBURG, PENNSYLVANIA, ASSIGNOR TO AMERICAN CAR AND FOUNDRY COMPANY, OF ST. LOUIS, MISSOURI, A CORPORATION OF NEW JERSEY.

MINE-CAR WHEEL WITH HUB-CAP.

1,256,137.  Specification of Letters Patent.  Patented Feb. 12, 1918.

Application filed September 22, 1917. Serial No. 192,693.

*To all whom it may concern:*

Be it known that I, WARREN V. JOHNSON, residing at Bloomsburg, Columbia county, State of Pennsylvania, and being a citizen of the United States, have invented certain new and useful Improvements in Mine-Car Wheels with Hub-Caps, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a vertical section through my improved wheel, the section through the hub being taken on the line 1—1 of Fig. 2;

Fig. 2 is an elevation of the inner side of said wheel, part of the spokes and the rim being broken away and the axle being shown in section; and Fig. 3 is a similar view of the outer side of the central portion of the wheel.

This invention relates to car wheels of a type well adapted for use in connection with mine cars, and includes means for capping an open end of the hub of such a wheel.

The arrangement is such that a roller bearing assembly may be inserted through the open end of the wheel hub, a hub cap being thereafter telescoped over this open hub end to be in circumscribing contact with the adjacent circumferential portion of the hub. It is further a purpose to provide the hub intermediate its ends with radial structure which extends outwardly toward the rim of the wheel. Extensions from the hub-circumscribing portion of the cap extend to and may be in radial parallelism with the structure radiating from the hub, suitable means being employed to lock the parallel parts together.

Consequently, the roller bearing assembly will be relatively permanently retained in the wheel hub, the hub chamber being maintained closed, and the wheel can be slipped on and off an axle with great facility and without dismantling the wheel structure. Also simple means are used for attaching the wheel to an axle.

Such other features as may become apparent hereinafter are, of course, to be regarded as coming within the scope of the present invention.

Referring to the drawings, 1 indicates the rim of my improved wheel, 2 the radiating spokes and 3 the wheel hub which is provided with a roller bearing chamber 4 and a lubricant chamber 5.

As shown in Fig. 1, the outer end of the hub is closed except for a lubricant inlet 6 in the outer end wall thereof which is threaded to receive a suitable closing plug. The inner end of the wheel hub is open but is adapted to be closed by a cap 7 hereinafter referred to. Before cap 7 is placed in position, a suitable roller bearing assembly is adapted to be inserted through the open inner end of the hub into the roller bearing chamber 4. Chamber 4 is preferably provided with a suitable sleeve or steel lining 8 to serve as a wearing surface for rollers 9 of the roller bearing assembly. Such roller bearing assembly is merely symbolically indicated, as a great variety of roller bearing assemblies may be inserted into the bearing chamber 4 of the hub. Ordinarily, roller retaining annuli 10 will be positioned at opposite sides of rollers 9 and will serve to retain these rollers in position when the wheel is off the axle.

Hub 3 intermediate its outer and inner ends is provided with radial structure projecting outwardly from the hub, which structure may partake of various forms. In the illustrated embodiment of my invention it is shown as relatively small webs 11 which radially project from the outer surface of the hub, merging therewith and, preferably, with one side of certain of the spokes 2. Each of these webs is seen to be positioned between a pair of spokes 2, and may, where it is desirable, merge not only with the hub 3, but also with both of the spokes between which it is located.

Webs 11 furnish places of anchorage for cap 7. Said cap comprises a circular web portion 12 lying parallel with the transverse face of the open end of the hub and an annular flange 13 which surrounds the adjacent circumferential portion of hub 3, said flange being merged with a plurality of extensions 14 that extend toward the opposite or closed end of the hub.

The annular circumscribing cap flange 13 preferably has a close fit with the portion of the hub circumference it surrounds, excluding the passage of foreign matter between the cap and the hub. The entrance of foreign matter is still further guarded against by the presence of suitable packing such as a gasket 23 interposed between the inner face of the hub and the next adjacent face of the web 12 of cap 7. Its extensions 14 are annularly spaced about the hub circumference and extend to the webs 11, their outer terminal portions 15 being bent radially to lie parallel with and against the faces of said webs 11. Rivets 16 or other suitable means pass through the radially disposed terminals 15 of flange extensions 14 binding them securely to webs 11, and hence securing the cap in position as shown in the drawings.

The circular web 12 of cap 7 is seen to project inwardly toward the axis of the wheel and to extend opposite the inner ends of rollers 9, thereby preventing the withdrawal of the roller bearing assembly.

It also forms one end of the roller bearing chamber 4, the opposite end thereof being created by an intermediate annular wall 17.

In mounting the wheel upon the axle 18, the outer end of the axle first passes through the central opening 19 in the circular web 12 of cap 7, thereafter passing between the rollers 9 until it is projected a suitable distance into the lubricant chamber 5. At opposite sides of the wall of lubricant chamber 5, thickened boss-producing portions 20 are present which serve as bearings for a bolt 21 that passes through lubricant chamber 5 and also through a grooved portion 22 in the outer end of axle 18 in tangential contact with the axle. A suitable nut retains bolt 21 in place, the bolt preventing the wheel from being withdrawn from axle 18. When the cap anchoring webs 11 are of the shape illustrated in the drawing, the terminals 15 of the flange extensions 14 are tapered or triangularly formed, in consequence of which a minimum amount of space is taken up between the adjacent spokes 2. This is a desirable condition since mine car wheels are of relatively small diameter, and the space between the spokes is used for spragging. With the space between the spokes so conserved, better opportunity is present for the insertion of the bar between the spokes with which the spragging is accomplished.

What I claim is:

1. In combination, a car wheel having a hub with an open end and provided with wheel structure spaced away from that end and disposed to extend radially in a direction transverse to the axis of the hub, and a cap comprising a web portion opposite the open end of said hub, a flange extending therefrom circumferentially surrounding the adjacent portion of the hub and extended portions from said flange secured to said radial metal structure.

2. In combination, a car wheel having a hub with an open end, spokes, radially extending webs therebetween, and a cap comprising a web portion opposite the open hub end, a flange therefrom circumferentially surrounding that hub end and extensions from said flange secured to said radial webs.

3. In combination, a wheel hub having a roller bearing chamber, an axle extending into the same, rollers surrounding said axle, wheel members projecting radially from the hub exterior, and a cap comprising a web portion extending opposite the rollers at the open hub end, a flange circumscribing the hub exterior near its open end and extensions from said flange secured to said wheel members.

4. In combination, a wheel with a hub having roller bearing and lubricant chambers, an axle positioned to be in both chambers, wheel-retaining means co-acting with said axle in the lubricant chamber, rollers surrounding the axle in the bearing chamber, wheel members projecting radially from the hub-exterior, and a roller-retaining cap at the open hub end provided with a hub-circumscribing flange connected to said wheel members.

5. In combination, a wheel hub with an open end, an axle, rollers between said axle and hub, outwardly extending wheel formation on the hub exterior, and a cap comprising a roller-retaining web at the open hub end, a flange therefrom in circumscribing contact with the hub adjacent that end and extended portions from said flange secured to said outward formation.

6. In combination, a wheel hub with an open end, spokes, webs therebetween extending outwardly from said hub, an axle, and a cap comprising an axle-penetrated web paralleling the open hub end and a flange-forming portion extending from said web in circumscribing contact with the hub exterior, said flange being provided with extensions locked to said webs.

7. In combination, a car wheel with a hub having an end face perforated by the bore of the hub, cap-anchoring wheel portions external to and intermediate the ends of said hub, a hub-encircling cap anchored to said wheel portions and having a web parallel with said perforated hub end face, and packing interposed between said face and the cap web.

8. In combination, a car wheel with a hub having closed outer and open inner ends, cap-anchoring wheel portions projecting radially from said hub intermediate its ends, and a hub-encircling cap telescoped with said inner hub end and provided with extensions from its hub-encircling portion anchored to said wheel portions.

9. In combination, a wheel hub having closed outer and open inner ends, an axle and a roller bearing entered in the hub through its inner end, cap-anchoring wheel portions external to and intermediate the hub ends, and a cap with a web disposed transversely of said hub retaining said roller bearing therein and perforated for the passage of said axle, said cap telescopically circumscribing the inner hub end and being anchored to said wheel portions.

10. In combination, a wheel hub having an open end, an axle entering said hub, radial wheel portions extending from the hub intermediate its ends, and a cap telescopically encircling the open hub end and provided with extensions having radial terminals parallel with and locked to said radial wheel portions.

11. In combination, a wheel with a hub having an open end and radial wheel portions extending outwardly from said hub intermediate its ends, and a single-piece cap telescopically surrounding the open hub end and being provided with spaced extensions in part projecting toward the opposite hub end and having radially disposed terminals locked in parallelism with said wheel portions.

12. In combination, a wheel comprising a hub with an open end, spokes and webs merged with some of said spokes, and a cap telescopically surrounding the open hub end and provided with annularly spaced extensions having radiating terminals locked to said webs.

13. In combination, a wheel comprising a hub with an open end, spokes and webs projecting outwardly from the hub between pairs of spokes, and a cap comprising a circular web paralleling the transverse face of the open hub end, an annular flange circumscribing said hub end and extensions therefrom radiating to said webs and locked thereto.

14. In combination, a wheel having a hub provided with an open end, radial members projecting from said hub intermediate its ends, an axle entering said hub, and a one-piece cap comprising a web paralleling the transverse face of the open hub end and perforated for the passage of said axle, a flange from said web circumscribing the hub near its open end and spaced extensions from said flange projecting longitudinally of said hub and radiating in parallelism with and secured to said radial members.

In witness whereof I have hereunto set my hand in the presence of two witnesses.

WARREN V. JOHNSON.

Witnesses:
 B. F. McLaughlin,
 Raymond H. Edwards.

Copies of this patent may be obtained for five cents each, by addressing the "Commissioner of Patents, Washington, D. C."